United States Patent
Al-Harbi et al.

(10) Patent No.: US 12,129,430 B1
(45) Date of Patent: Oct. 29, 2024

(54) COMPOSITIONS INCLUDING A SUBSTRATE AND A FUNCTIONAL MOLECULE AND RELATED METHODS

(71) Applicant: Saudi Arabian Oil Company, Dhahran (SA)

(72) Inventors: Bader Ghazi Al-Harbi, Dammam (SA); Edreese Alsharaeh, Riyadh (SA); Wengang Li, Dhahran (SA); Haneen Omar, Riyadh (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/335,397

(22) Filed: Jun. 15, 2023

(51) Int. Cl.
C09K 8/528 (2006.01)
(52) U.S. Cl.
CPC .......... *C09K 8/528* (2013.01); *C09K 2208/10* (2013.01)
(58) Field of Classification Search
None
See application file for complete search history.

(56) References Cited

U.S. PATENT DOCUMENTS

| 6,204,429 | B1 * | 3/2001 | Gupta | .................. | E21B 43/003 588/407 |
| 9,133,034 | B2 | 9/2015 | Hou | | |

| 2021/0060522 | A1 | 3/2021 | El Shall et al. | |
| 2021/0062076 | A1 * | 3/2021 | Li | ......................... C09D 163/00 |
| 2022/0275270 | A1 * | 9/2022 | Agarwal | .................. C09K 8/62 |
| 2023/0040360 | A1 * | 2/2023 | Li | ........................... C09K 8/805 |

FOREIGN PATENT DOCUMENTS

CN 107497404 12/2017

OTHER PUBLICATIONS

BinMerdhah, "Inhibition of barium sulfate scale at high-barium formation water," Journal of Petroleum Science and Engineering, Jul. 2012, 90-91 : 124-130, 7 pages.
Gamal et al., "Barium Sulfate Scale Removal At Low-Temperature," Geofluids, Mar. 2021, 12 pages.
Gasimli et al., "Iron Sulfide Scale Inhibition in Carbonate Reservoirs," ACS omega, 2022, 7(30):26137-26153, 17 pages.
Ishtiaq et al., "Graphene oxide/carbon nanotubes nanocoating for improved scale inhibitor adsorption ability onto rock formation," Journal of Petroleum Exploration and Production Technology, 2020, 10(1):149-157, 9 pages.
Jaberi et al., "Minimizing the Barite Scale in Carbonate Formations during the Filter Cake Removal Process." ACS OMEGA, 2022, 7(1), 17976-17983, 8 pages.

(Continued)

*Primary Examiner* — John J Figueroa
(74) *Attorney, Agent, or Firm* — Fish & Richardson P.C.

(57) ABSTRACT

The disclosure relates to compositions that include a substrate having attached thereto functional molecules capable of interacting with ions, and related methods. Examples of the substrate include graphene, boron nitride and a graphene-boron nitride hybrid. The compositions can reduce (e.g., prevent) scale formation and/or dissolve scale formations in oil and gas production, transportation, storage, and processing systems, such as scales caused by calcium, barium and/or strontium ions.

17 Claims, 15 Drawing Sheets

(56) References Cited

OTHER PUBLICATIONS

Kim, et al., "Engaging a Battle on Two Fronts: Dual Role of Polyphosphates as Potent Inhibitors of Struvite Nucleation and Crystal Growth," Chemistry of Material, Sep. 2020, 32(19):8672-8682, 13 pages.

Mazumder et al., "A Review Of Green Scale Inhibitors: Process, Types, Mechanism And Properties," Coatings, Sep. 2020, 10(10):928, 29 pages.

Muhsan et al., "Nanocarbon-based enhanced squeeze treatment for improved scale management," In IOP Conference Series: Materials Science and Engineering, 2018, 458(1):012044, 12 pages.

Tang et al., "Graphene oxide on microbially induced calcium carbonate precipitation," International Biodeterioration & Biodegradation, Aug. 2019, 145:104767, 7 pages.

Wang et al., "Graphene Reinforced Composites as Protective Coatings for Oil and Gas Pipelines," Nanomaterials, Dec. 2018, 8(12):1005, 14 pages.

\* cited by examiner

COMPOSITIONS INCLUDING A SUBSTRATE AND A FUNCTIONAL MOLECULE AND RELATED METHODS

FIELD

The disclosure relates to compositions that include a substrate having attached thereto functional molecules capable of interacting with ions, and related methods. Examples of the substrate include graphene, boron nitride and a graphene-boron nitride hybrid. The compositions can reduce (e.g., prevent) scale formation and/or dissolve scale formations in oil and gas production, transportation, storage, and processing systems, such as scales caused by calcium, barium and/or strontium ions.

BACKGROUND

Scale formation can occur in oil and gas production, transportation, storage, and processing systems. Examples of scales include carbonate and sulfate scales with barium, calcium and strontium.

SUMMARY

The disclosure relates to compositions that include a substrate having attached thereto functional molecules capable of interacting with ions, and related methods. Examples of the substrate include graphene, boron nitride and a graphene-boron nitride hybrid. The compositions can reduce (e.g., prevent) scale formation and/or dissolve scale formations in oil and gas production, transportation, storage, and processing systems, such as scales caused by calcium, barium and/or strontium ions.

The compositions and methods can reduce (e.g., prevent) reductions in fluid flow, equipment failure and/or decreases in production efficiency associated with scale formation. The compositions and methods can also reduce (e.g., prevent) certain maintenance costs and safety hazards associated with scale formation.

The compositions and methods of the disclosure can be less expensive, more efficient, longer lasting, use smaller amounts of scale inhibitor and/or demonstrate relatively good stability under relatively harsh downhole conditions relative to certain other compositions and methods for reducing scale formation.

The compositions can be made relatively easily and inexpensively. The methods to make the compositions can be relatively safe, environmentally benign and scalable.

The compositions can have certain beneficial chemical and/or physical properties that can be useful for a variety of applications. For example, in certain embodiments, the compositions can have a relatively high thermal conductivity, relatively high chemical stability and/or anti-bacterial properties.

Without wishing to be bound by theory, it is believed that the compositions can adsorb to a rock surface, which can increase the squeeze treatment lifetime (the duration for which the concentration of the chemical is released at a concentration above the required minimum inhibitor concentration (MIC)). Adsorption to pores of rock surfaces may enhance squeeze lifetime, allowing for less scale inhibitor to be used relative to certain other scale inhibitors with poorer adsorption to rock surfaces.

Without wishing to be bound by theory, in certain embodiments, the compositions and methods can reduce corrosion in an oil and gas production, transportation, storage, and/or processing systems due to anti-corrosion properties of the compositions of the disclosure.

In a first aspect, the disclosure provides a composition that includes: a substrate selected from boron nitride and a graphene-boron nitride hybrid; and a plurality of first functional molecules attached to the substrate. The first functional molecules are capable of interacting with ions.

In some embodiments, the substrate includes boron nitride.

In some embodiments, the substrate includes the graphene-boron nitride hybrid. In some embodiments, the substrate includes from 10 wt. % to 90 wt. % graphene and from 10 wt. % to 90 wt. % boron nitride.

In some embodiments, the composition further includes a plurality of second functional molecules different from the first functional molecules. The second functional molecules are capable of interacting with ions. In some embodiments, the first functional molecules have a first interaction energy with a first ion and the second functional molecules have a second interaction energy with a first ion different from the first interaction energy with the first ion. In some embodiments, the first functional molecules have a first interaction energy with a second ion and the second functional molecules have a second interaction energy with a second ion different from the first interaction energy with the second ion.

In some embodiments, first functional molecules include a chelating agent and/or a threshold inhibitor.

In some embodiments, the first functional molecules include an inorganic phosphate, an organophosphorous compound and/or an organic polymer.

In some embodiments, the first functional molecules include acrylamide (AM), polyacrylamide (PAM), polymethyl methacrylate (PMMA), ethylenediaminetetraacetic acid (EDTA), diethylenetriamine pentaacetic acid (DTPA), poly-phosphono carboxylic acid (PPCA) and/or diethylenetriaminepenta (methylene phosphonic acid) (DETPMP).

In some embodiments, the composition includes 1 wt. % to 20 wt. % of the first functional molecules and 80 wt. % to 99 wt. % of the substrate.

In some embodiments, a length of the substrate is from 100 nm to 50000 nm.

In a second aspect, the disclosure provides a method that includes disposing a composition of the disclosure into a member selected from a hydrocarbon production system, a hydrocarbon transportation system, a hydrocarbon storage system, and a hydrocarbon processing system.

In certain embodiments, the member includes a fluid, the fluid includes ions, and at least a portion of the ions interact with the composition. In certain embodiments, the ions include barium cations, calcium cations and/or strontium cations.

In certain embodiments, a surface of the member includes scale and disposing the composition into the member dissolves at least a portion of the scale. In certain embodiments, the scale includes barium sulfate scale, a calcium sulfate scale, and/or a strontium sulfate scale.

In a third aspect, the disclosure provides a system that includes: a member selected from a hydrocarbon production system, a hydrocarbon transportation system, a hydrocarbon storage system, and a hydrocarbon processing system; and a composition of the disclosure disposed in a component of the member.

In certain embodiments, the member includes a fluid, the fluid includes ions, and at least a portion of the ions interact with the composition. In certain embodiments, the ions include barium cations, calcium cations and/or strontium cations.

DETAILED DESCRIPTION

Figure 1:
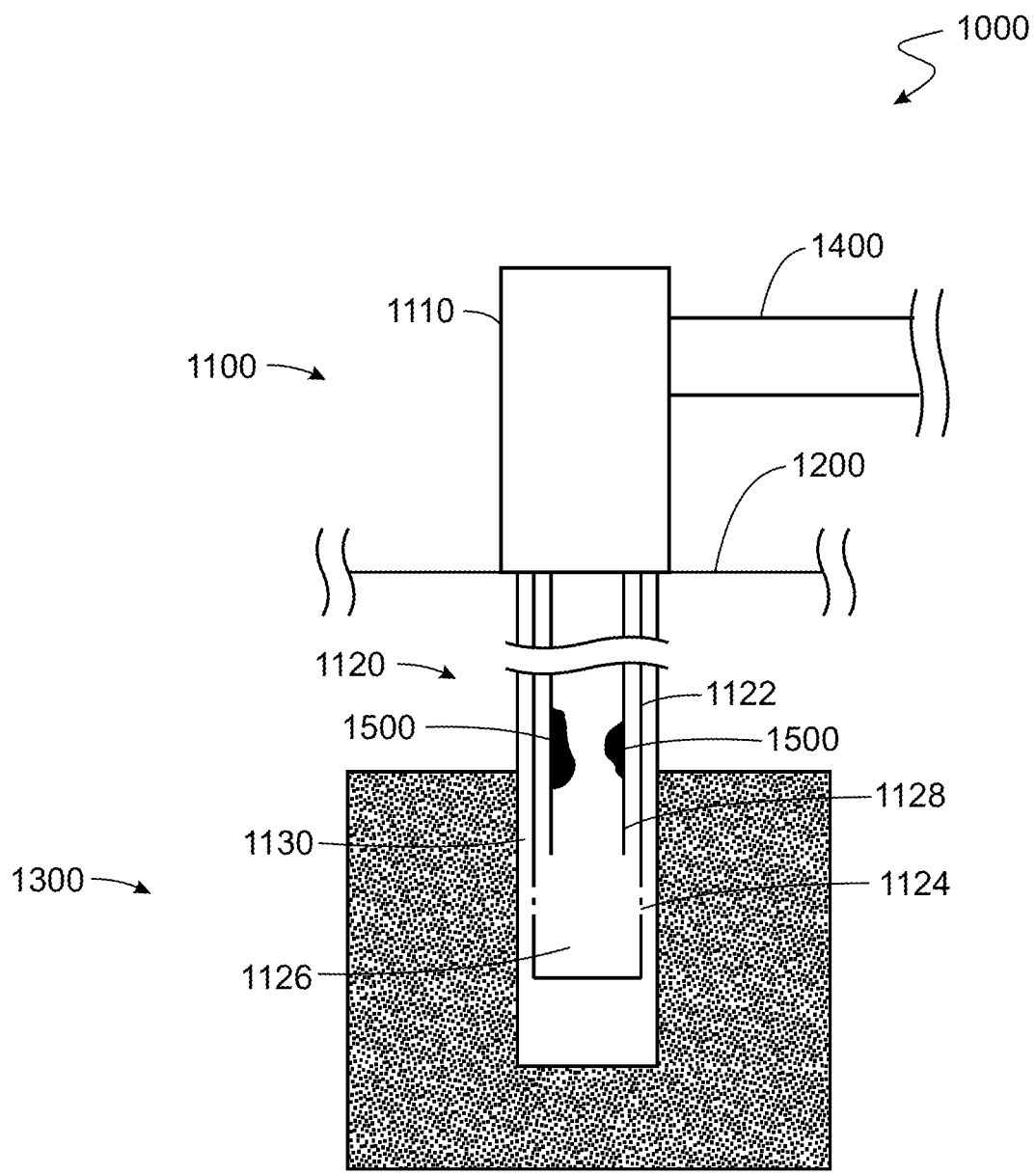
FIG. 1 depicts a schematic of a system.

FIG. 1 schematically depicts a system 1000 that includes a hydrocarbon-producing (e.g., oil-producing, gas-producing) well 1100 having a first portion 1110 above a surface of the earth 1200 and a second portion 1120 that extends below the surface of the earth 1200, through a borehole 1130, and into an underground formation 1300. The second portion 1120 includes a casing 1122 having perforations 1124. The well 1100 is designed so that the perforations 1124 allow for fluid communication between an interior region 1126 of the casing 1122 and the underground formation 1300. A production tubing 1128 is disposed inside the casing 1122 to transport the hydrocarbon to the surface. A transfer line 1400 transports a hydrocarbon produced from the hydrocarbon-producing well 1100 to a downstream component, such as a hydrocarbon transportation system (e.g., pipeline), storage system (e.g., a storage vessel) or processing system. In addition to the produced hydrocarbon, the well 1100 can produce water. Sulfate and/or carbonate and ions of divalent earth metals (barium, calcium, and/or strontium) dissolved in the water can form scale 1500 inside the production tubing 1128.

Although depicted in FIG. 1 as being in present inside the production tubing 1128, in some embodiments, scale can additionally or alternatively form on one or more other components of the hydrocarbon-producing well 1100. In some embodiments, scale can form on the casing 1122, the perforations 1124, the borehole 1130, pumps, valves, the transfer line 1400 and/or a component of the first portion 1110 above the surface of the earth 1200. In some embodiments, scale can form on a component upstream or downstream of the components shown in FIG. 1, such as a downstream hydrocarbon transportation system (e.g., a pipeline), a hydrocarbon storage system (e.g., a storage vessel), and/or a hydrocarbon processing system.

Figure 2:
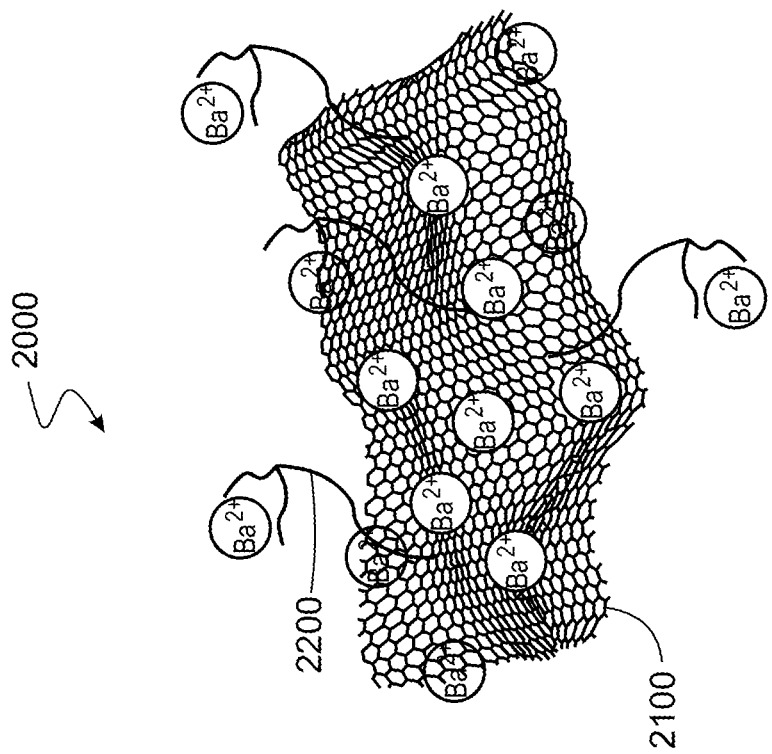
FIG. 2 depicts a schematic of a composition interacting with barium cations.
Figure 2:
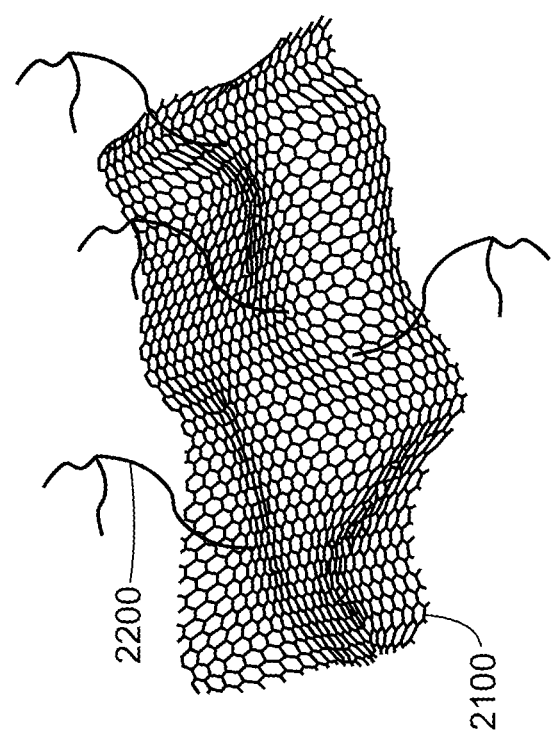

FIG. 2 depicts a schematic of a composition 2000 interacting with barium cations. The composition 2000 includes a substrate 2100 with functional molecules 2200 covalently bound to the substrate 2100. Alternatively or additionally, the functional molecules 2200 are bound to the substrate 2100 via Van der Waals forces. Generally, the substrate 2100 can be a nanocomposite and/or two dimensional (2D). Examples of the substrate 2100 include graphene, boron nitride and a graphene-boron nitride hybrid (see discussion below).

The substrate 2100 and functional molecules 2200 can interact with certain ions, such as ions of divalent earth metals and certain metal ions. The functional molecules 2200 can be a chelating agent and/or a threshold scale inhibitor (see discussion below). Without wishing to be bound by theory, it is believed that barium cations can interact with both the functional molecules 2200 and the substrate 2100 via non-covalent interactions (see discussion below). The non-covalent interactions can include ion-π interactions. Such interactions can reduce (e.g., prevent) the formation of barium scale (e.g., barium sulfate) and/or cause the dissolution of an existing barium scale (e.g., barium sulfate).

While FIG. 2 depicts the composition 2000 interacting with barium cations to reduce (e.g., prevent) the formation of barium scale (e.g., barium sulfate) and/or cause the dissolution of an existing barium scale (e.g., barium sulfate), the composition can interact with other ions (e.g., calcium cations, strontium cations) to reduce (e.g., prevent) the formation of scales and/or cause the dissolution of existing scales associated with the ions.

In general, the composition 2000 can be applied in the field at any point and/or component in a hydrocarbon (e.g., oil, gas, petroleum) production, transportation, storage, and/or processing system. For example, in some embodiments, the composition 2000 can be disposed in a component of the system 1000 such as the underground formation 1300, the production tubing 1128, and/or the transfer line 1400. Additionally or alternatively, the composition 2000 can be disposed in treatment equipment, a transportation pipeline and/or a storage vessel. In certain embodiments, the composition 2000 is added as a powder. In certain embodiments, the compositions 2000 can be mixed with injection water. In certain embodiments, the composition 2000 can be applied as a coating material on the inner surface of an appropriate element of a system, such as, for example, a pipeline, a pump and/or a valve.

In certain embodiments, the composition 2000 can be added into a fluid in a hydrocarbon production, transportation, storage, and/or processing system to reduce (e.g., prevent) scale formation. In certain embodiments, the composition 2000 can be added into in a hydrocarbon production, transportation, storage, and/or processing system to dissolve existing scale 1500. The scale can include a barium sulfate scale, a calcium sulfate scale and/or a strontium sulfate scale.

Figure 3:
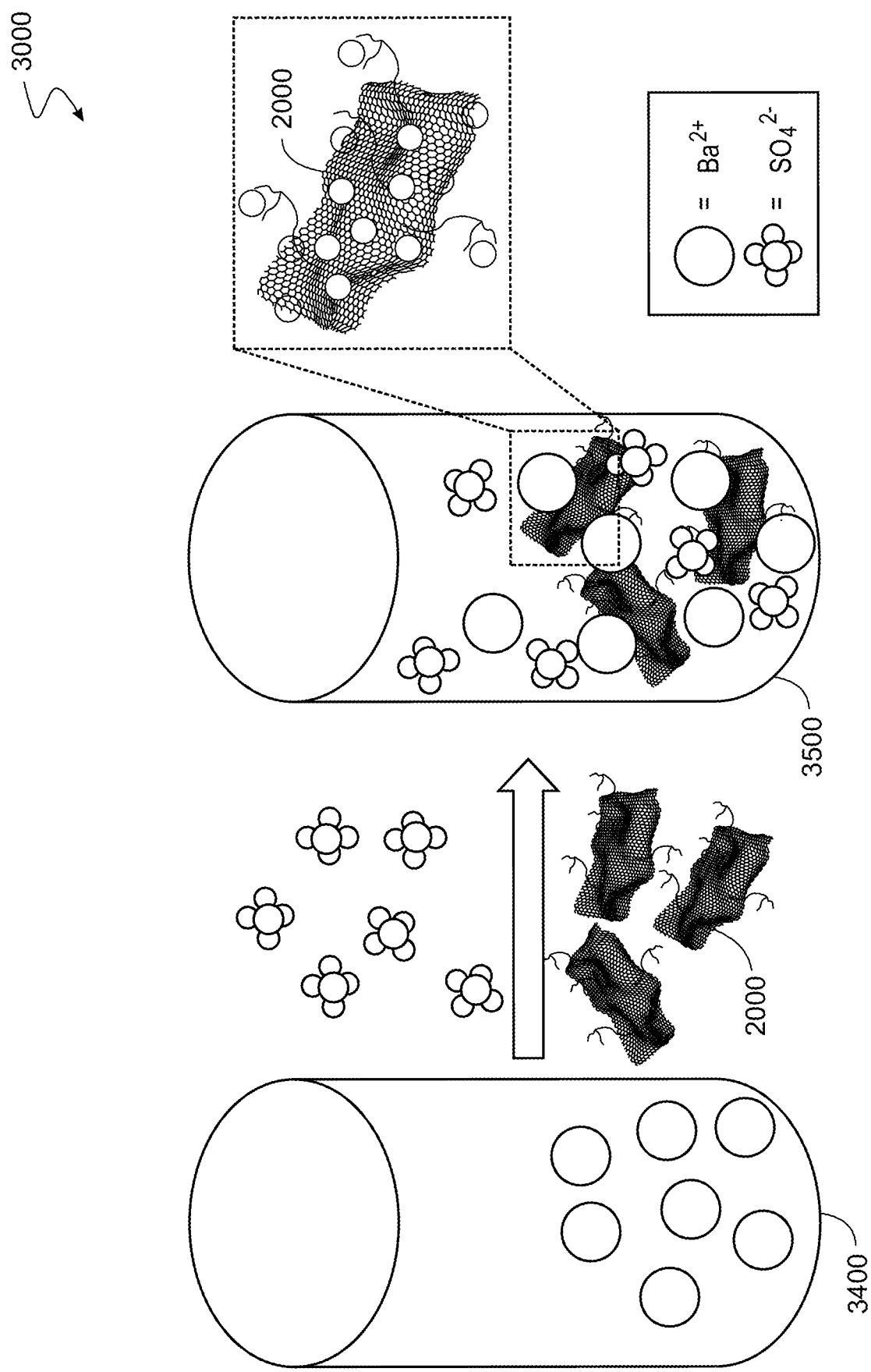
FIG. 3 depicts a schematic of a method.

FIG. 3 depicts a schematic of a method 3000. A first solution 3400 contains barium cations. Sulfate anions and the composition 2000 are added to the solution to form a second solution 3500. In the second solution 3500, the barium cations interact with the composition 2000, as shown in FIG. 2. As a result, the ability of the sulfate ions and the barium ions to interact to form a barium sulfate scale is reduced compare to the situation that would hold in the absence of the composition 2000.

Without wishing to be bound by theory, it is believed that the specific surface area of the substrate 2100 can affect the interaction of the cations to the substrate 2100. For example, barium cations have a larger atomic radius than calcium cations, thus barium cations would demonstrate more favorable and/or enhanced interactions to a substrate 2100 with a larger specific surface area and calcium cations would demonstrate more favorable and/or enhanced interactions to a substrate 2100 with a smaller specific surface area. The surface area can be measured, for example, using nitrogen adsorption-desorption techniques.

In certain embodiments, the substrate 2100 has a length of at least 100 (e.g., at least 500, at least 1000, at least 5000, at least 10000) nm and/or at most 50000 (e.g., at most 10000, at most 5000, at most 1000, at most 500) nm. In certain embodiments, the substrate 2100 has a specific surface area of at least 10 (e.g., at least 50, at least 100, at least 150, at least 200, at least 250) $m^2/g$ and/or at most 300 (e.g., at most 250, at most 200, at most 150, at most 100, at most 50) $m^2/g$ In some embodiments, the functional molecule 2200 is a chelating agent. Without wishing to be bound by theory, chelating agents bind and sequester positively charged ions to form relatively stable, water-soluble complexes that reduce (e.g., prevent) the formation and/or accumulation of scale. The chelating agents include negative functional groups that have an affinity for cations (e.g., barium cations, calcium cations, strontium cations), leading to the coordination of the cations, thereby hindering the cations' interactions with anions that cause scale and reducing (e.g., preventing) the scaling process. Stronger interactions between the chelating agent and the cations can result in increased scaling inhibition. Examples of the chelating agent include ethylenediaminetetraacetic acid (EDTA) and diethylenetriamine pentaacetic acid (DTPA).

In some embodiments, the functional molecule 2200 is a threshold scale inhibitor. Without wishing to be bound by theory, it is believed that threshold scale inhibitors can reduce (e.g., prevent) scale formation by delaying and/or reducing (e.g., preventing) crystal nucleation and/or crystal growth, thereby hindering the occurrence of scale formation. Any stage of scale development can be impacted, such as aggregation, nucleation, crystal growth and/or agglomeration. The process includes forming an interaction between the threshold scale inhibitor and the crystal nucleation sites of the growing scale crystals, thereby blocking the active crystal growth sites and stopping any further crystal growth. The threshold scale inhibitor can form a layer over the accumulated scale, blocking further growth. Without wishing to be bound by theory, it is believed that threshold scale inhibitors can be relatively cost-effective as they can reduce (e.g., prevent) scale formation at relatively low concentrations, such as stoichiometry ratios of 1:1000 threshold scale inhibitor to scale forming ions. Without wishing to be bound by theory, it is believed that threshold scale inhibitors can reduce (e.g., prevent) nucleation and scale formation at concentrations that are too low to be effective by stoichiometrically reacting with scale-forming ions alone, such as occurs with chelating agents.

Without wishing to be bound by theory, it is believed that crystal growth can be reduced (e.g., prevented) using threshold inhibition, crystal modification and/or dispersion.

Without wishing to be bound by theory, it is believed that threshold inhibition is an inhibition mechanism that works on delaying crystal growth. The scale inhibitor can function as a nucleation center that covers the growing crystals. As a result, the scale inhibitor can block active crystal growth sites, reducing (e.g., preventing) further crystal formation.

Without wishing to be bound by theory, it is believed that crystal modification can be achieved by the modification of the crystal's surface, which can cause it to distort or deform as it grows. This distortion and deformation of the crystal can reduce (e.g., prevent) the growth of the typically highly ordered crystals.

Without wishing to be bound by theory, it is believed that the dispersion mechanism can use highly charged synthetic polymers called dispersants to reduce (e.g., prevent) small crystals from agglomerating into larger ones by charge reinforcement or steric stabilization. The increase in the negative electrical charge of particles in the solution can lead to electrostatic repulsion and can increase the stabilization of the crystals, resulting in keeping the crystals small enough to be dispersed.

Examples of threshold scale inhibitors include inorganic phosphates; organophosphorus compounds, such as organic phosphonates and organic phosphate esters (e.g., hexametaphosphate (HMP) and tripolyphosphate (TPP)); and organic polymers. Examples of inorganic phosphates includes polyphosphates, sodium triphosphate, and sodium hexametaphosphate. Examples of the organic phosphonates include organic phosphonic acids (e.g., 1-hydroxyethane-1,1-bis (phosphonic acid) (HEDP), aminotris(methylenephosphonic acid) (ATMP), 2-phosphonobutane-1,2,4-tricarboxylic acid (PBTC)) and their salts, and nitrogen-containing compounds such as amino-alkylene phosphonates. Examples of organic polymers include polycarboxylic acids and their derivatives, salts, and esters with low alcohols (e.g., methanol, ethanol), and derivatives of polymers derived from maleic anhydride, maleic acid, acrylic acid, or methacrylic acid.

In some embodiments, the functional molecule 2200 includes acrylamide (AM), a polymer such as polyacrylamide (PAM) or polymethyl methacrylate (PMMA), EDTA, DTPA, poly-phosphono carboxylic acid (PPCA) and/or diethylenetriaminepenta (methylene phosphonic acid) (DETPMP). In some embodiments, the composition 2000 includes EDTA and AM, EDTA and PAM, or AM and PAM (see discussion below).

Figure 4:
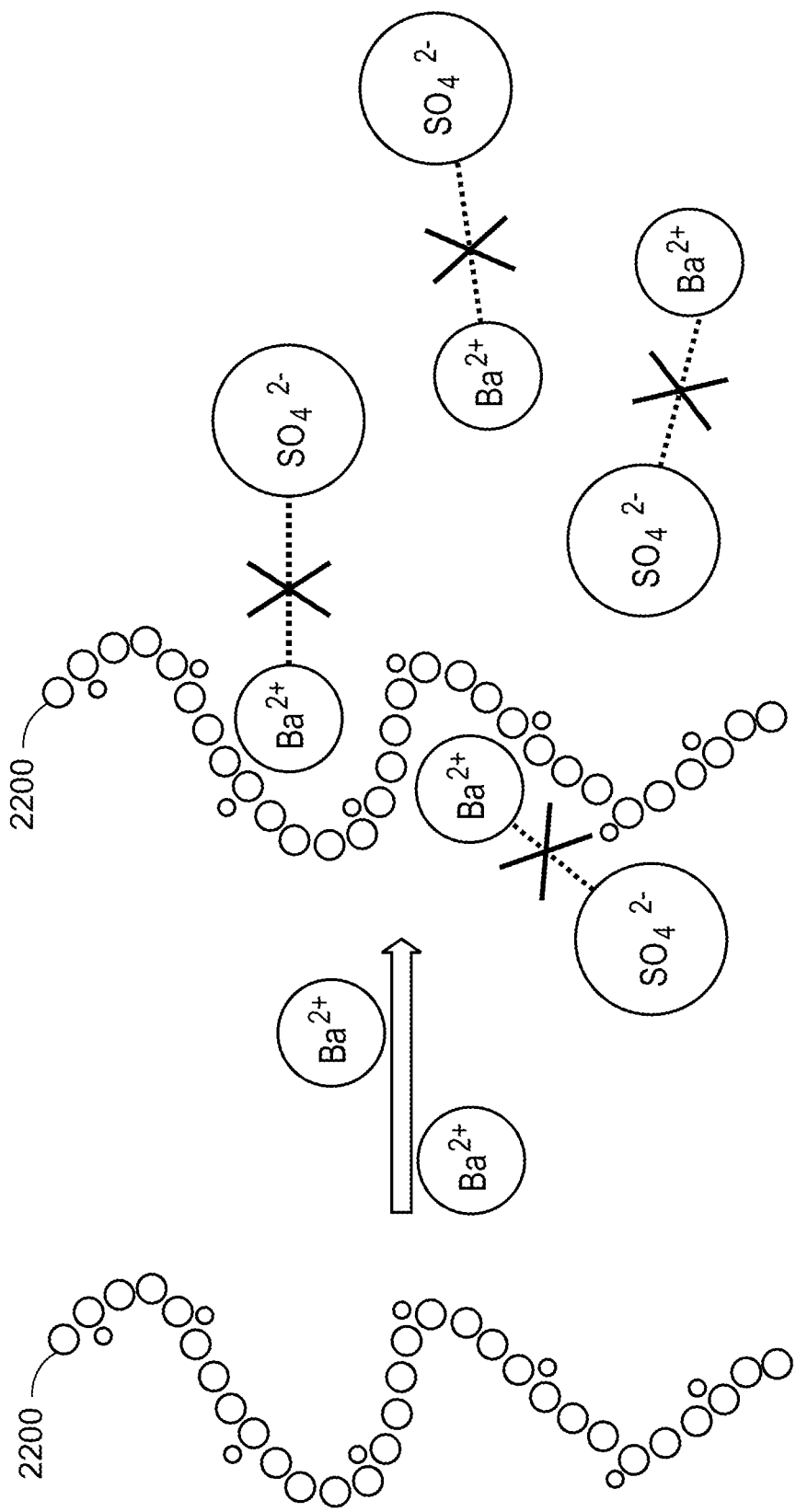
FIG. 4 depicts a schematic of a functional molecule interacting with barium cations.

FIG. 4 depicts a schematic of a functional molecule 2200 interacting with barium cations in solution via non-covalent ion-x interactions. The interactions between the functional molecule 2200 and the barium cations can reduce (e.g., prevent) interactions between the barium cations and sulfate ions.

Without wishing to be bound by theory, it is believed that the composition 2000 has enhanced scale inhibition and dissolution efficiency relative to the functional molecule 2200 alone. For example, a composition 2000 with EDTA as the functional molecule 2200 would demonstrate improved scale inhibition and dissolution efficiency relative to an equivalent amount of EDTA alone. Without wishing to be bound by theory, it is believed that the substrate 2100 acts as an adsorption surface that enhances scale dissolution by cation-x interactions.

Figure 5:
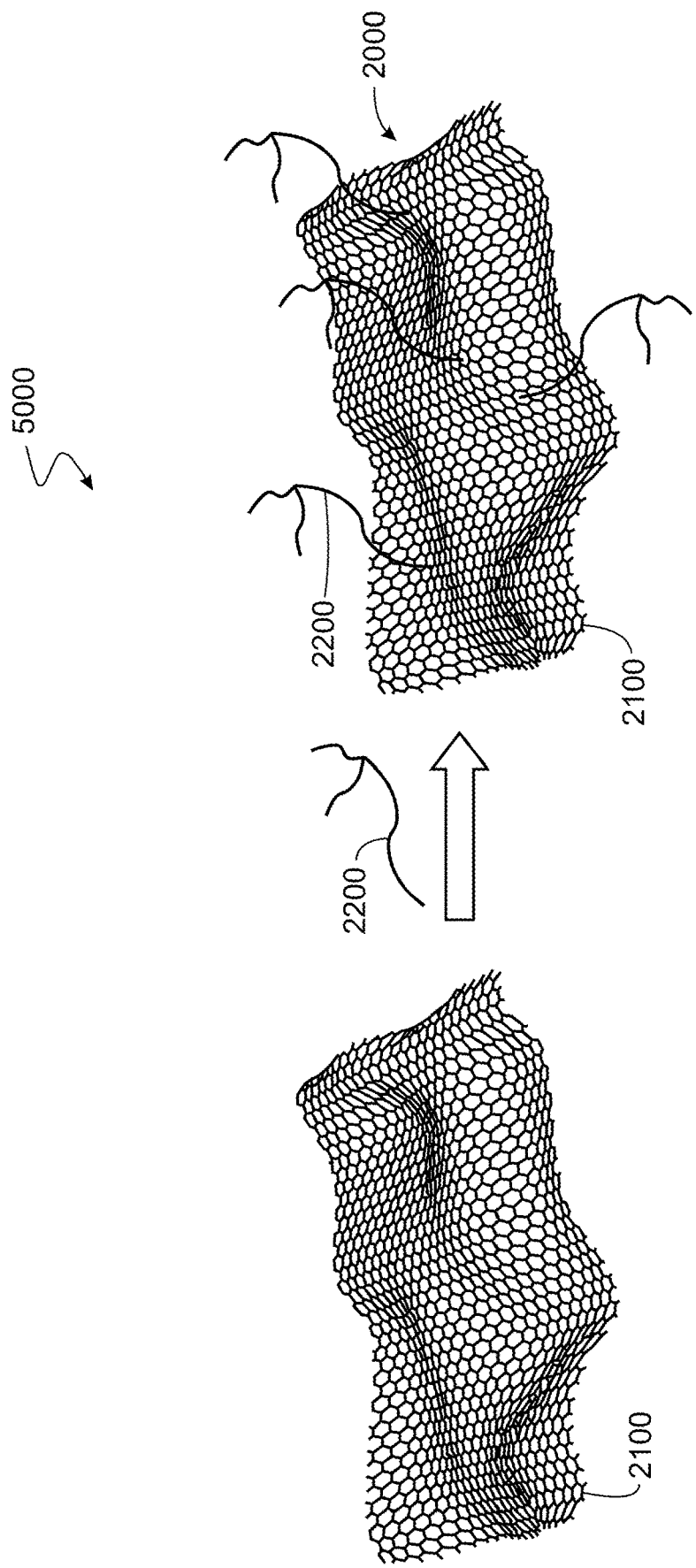
FIG. 5 depicts a schematic of a method.

FIG. 5 depicts a schematic of a method 5000 for forming the composition 2000. The substrate 2100 and a plurality of the functional molecules 2200 are combined with mechanical mixing to form the composition 2000. In some embodiments, the mechanical mixing includes ball milling. Without wishing to be bound by theory, it is believed that the mechanical force can break bonds at the edges of the substrate 2100, which allows the substrate 2100 to be covalently functionalized with the functional molecules 2200.

In general, ball milling technology is a relatively simple, efficient, low-cost and scalable method for edge-functionalization of 2D materials (e.g., the substrate 2100). Generally, the substrate 2100 is mixed with an appropriate amount of functional molecules 2200 (such as EDTA) in a sealed canister, followed by high-speed ball milling. The relatively strong shear forces generated between high-speed rotating balls can cause the mechanochemical cracking of the C—C bonds (either on the edges or basal plane of the substrate 2100), leading to the spontaneous incorporation of the functional molecules 2200 at the broken edges and/or at the basal plane of the substrate 2100 as well as the subsequent exfoliation of the substrate 2100.

In some embodiments, the composition 2000 includes at least 1 (e.g., at least 2, at least 5, at least 10, at least 15) wt. % and/or at most 20 (e.g., at most 15, at most 10, at most 5, at most 2) wt. % of the functional molecules 2200. In some embodiments, the composition 2000 includes at least 80 (e.g., at least 85, at least 90, at least 95, at least 98) wt. % and/or at most 99 (e.g., at most 98, at most 95, at most 90, at most 85) wt. % of the substrate 2100. In some embodiments, the composition 2000 includes 90 wt. % of the substrate 2100 and 10 wt. % of the functional molecules 2200.

The graphene-boron nitride hybrid can be formed by mechanically mixing graphene with hexagonal boron nitride. In some embodiments, the mechanical mixing includes ball milling. In general, the graphene-boron nitride hybrid is formed prior to functionalization with the functional molecules 2200. In some embodiments, the graphene-boron nitride hybrid includes at least 10 (e.g., at least 20, at least 30, at least 40, at least 50, at least 60, at least 70, at least 80) wt. % and/or at most 90 (e.g., at most 80, at most 70, at most 60, at most, 50, at most 40, at most 30, at most 20) wt. % graphene. In some embodiments, the graphene-boron nitride hybrid includes at least 10 (e.g., at least 20, at least 30, at least 40, at least 50, at least 60, at least 70, at least 80) wt. % and/or at most 90 (e.g., at most 80, at most 70, at most 60, at most, 50, at most 40, at most 30, at most 20) wt. % boron nitride. Without wishing to be bound by theory, it is believed that combining graphene and boron nitride to form the graphene-boron nitride hybrid forms a complex ternary system (boron carbonitride) retaining the unique properties of each material, resulting in increased thermal conductivity and mechanical properties while minimizing the friction coefficient. Without wishing to be bound by theory, it is believed that the graphene and boron nitride interact through both covalent and Van der Waals forces.

In some embodiments, ball milling (to form the composition 2000 and/or the graphene-boron nitride hybrid) is performed for at least 1 (e.g., at least 2, at least 3, at least 4, at least 5, at least 6, at least 7, at least 8, at least 9, at least 10, at least 15, at least 20, at least 25, at least 30, at least 35, at least 40, at least 45, at least 50, at least 55) minute(s) and/or at most 60 (e.g., at most 55, at most 50, at most 45, at most 40, at most 35, at most 30, at most 25, at most 20, at most 15, at most 10, at most 9, at most 8, at most 7, at most 6, at most 5, at most 4, at most 3, at most 2) minutes.

Figure 6:
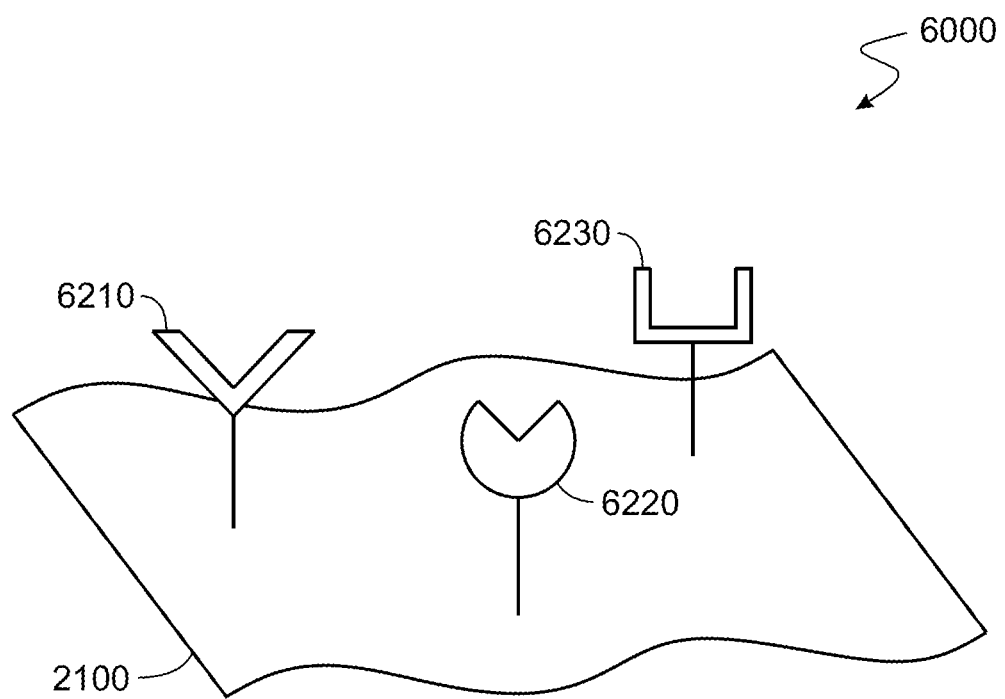
FIG. 6 depicts a schematic of a composition.

In some, embodiments, different functional molecules can be covalently attached to the substrate 2100. FIG. 6 depicts a schematic of a composition 6000. The composition 6000 includes the substrate 2100 with first functional molecules 6210, second functional molecules 6220 and third functional molecules 6230, which are different from each other, covalently bound to the substrate 2100.

Figure 7:
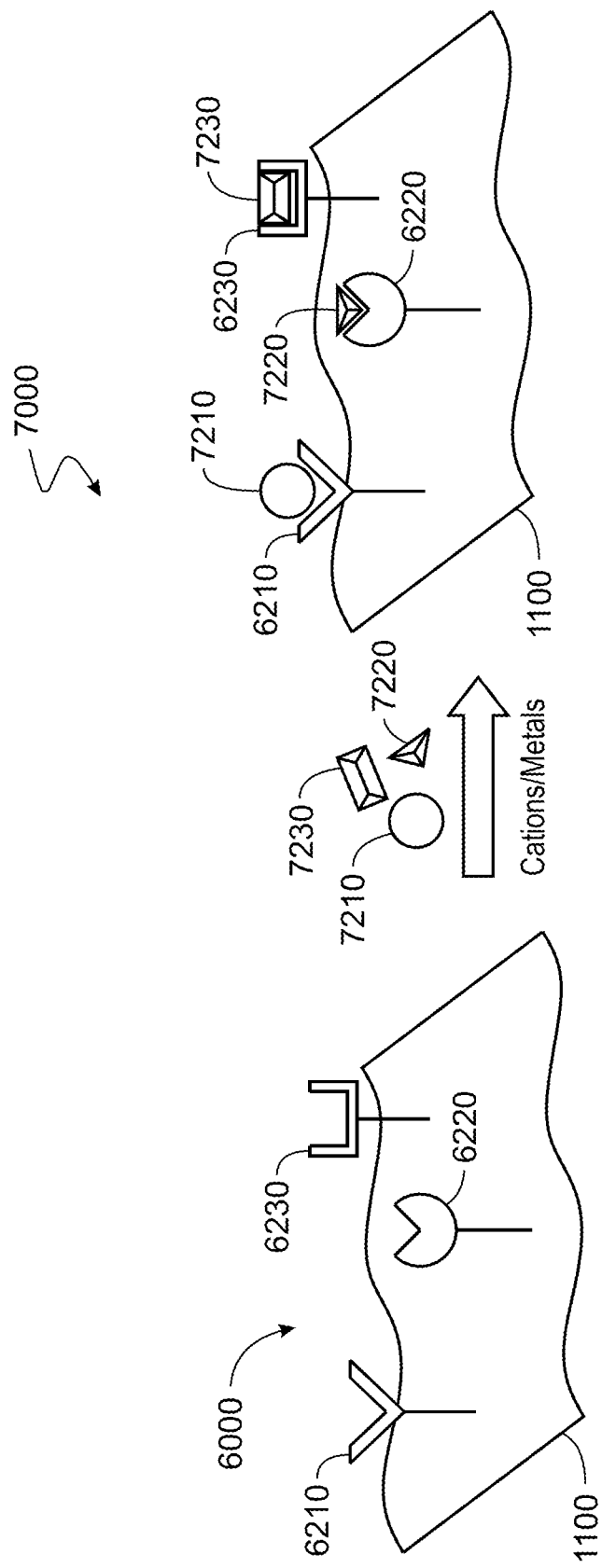
FIG. 7 depicts a schematic of a method.

FIG. 7 depicts a schematic of a method 7000. The composition 6000 is contacted with first ions 7210, second ions 7220 and third ions 7230, which are different from each other. The first functional molecules 6210 interact with the first ions 7210, the second functional molecules 6220 interact with the second ions 7220 and the third functional molecules 6230 interact with the third ions 7230. The composition 6000 can therefore interact with different ions simultaneously. Additionally, without wishing to be bound by theory, it is believed that the first ions 7210, second ions 7220 and/or third ions 7230 can interact with the substrate 2100.

Examples of the first ions 7210, second ions 7220 and third ions 7230 include cations that can form a scale, such as barium ($Ba^{2+}$), calcium ($Ca^{2+}$), and strontium ($Sr^{2+}$) and metals such as ions of Fe (e.g., $Fe^{2+}$), Mg, Si, Al, Co, Sr, Cr, Pb, and Zn.

The first functional molecules 6210, second functional molecules 6220 and third functional molecules 6230 can each possess different affinities for different ions. For example, the first functional molecules 6210 can have a relatively high affinity for barium ($Ba^{2+}$) and the second functional molecules 6220 can have a relatively high affinity for a metal, such as $Fe^{2+}$ allowing the composition 6000 to interact with both ions simultaneously. For example, ethylene diamine tetraacetic acid (EDTA), sodium tripolyphosphate (TPP) and/or phosphonate (hydroxyethylidine-1,1-diphosphonic acid) (HEDP) can be used as the functional molecule to bind barium and diethylene triamine pentaacetic acid (DTPA) and/or tetrakis (hydroxymethyl) phosphonium sulfate (THPS) can be used as the functional molecule to bind iron.

While the composition 6000 is depicted with three different functional molecules, the composition 6000 can include two, four, five, or more than five, different functional molecules.

Figure 8:
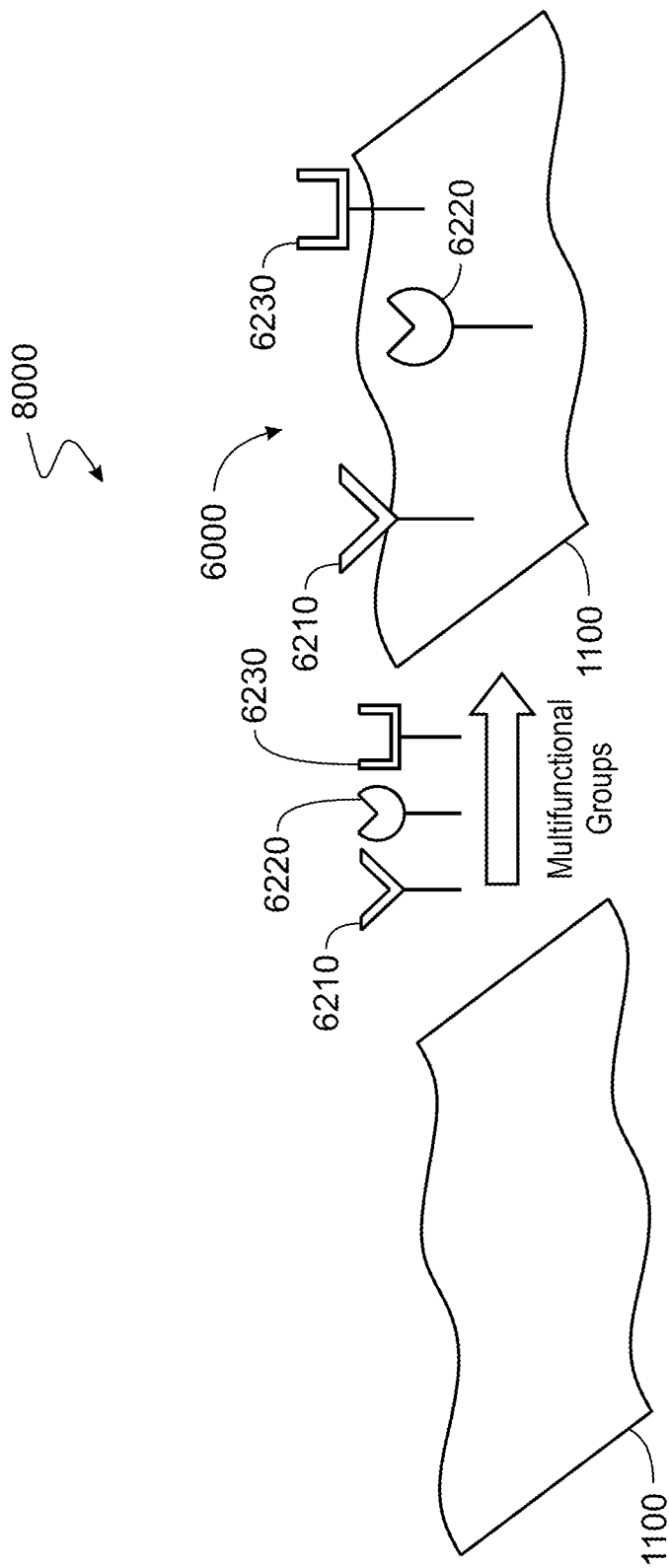
FIG. 8 depicts a schematic of a method.

FIG. 8 depicts a schematic of a method 8000 for forming the composition 6000. The substrate 2100 and a plurality of the first functional molecules 6210, second functional molecules 6220 and third functional molecules 6230 are combined with mechanical mixing to form the composition 2000. In some embodiments, the mechanical mixing can include ball milling (see discussion above). Without wishing to be bound by theory, it is believed that the mechanical force can break bonds at the edges of the substrate 2100, which allows the substrate 2100 to be covalently functionalized with the first functional molecules 6210, second functional molecules 6220 and third functional molecules 6230 simultaneously.

EXAMPLES

Example 1

Different compositions were prepared using a ball-milling machine (SPEX sample prep 8000M mixer/mill, S/N: 10384) with different weight percentage ratios of EDTA to the substrate (commercial graphene (CG) (xGnP Graphene Nanoplatelets—Grade M), boron nitride (BN) (Sisco Research Laboratories Pvt. Ltd. (Product code: 75454)), or a hybrid of commercial graphene and boron nitride (CG+BN) prepared in house), for a final mass of 1000 mg. A ratio of 90:10 wt. % substrate to EDTA was used. The vial was 21/4 inches in diameter and 3 inches long. The vial included a screw-on cap with an O-ring. Two ½" (12.7 mm) and four ¼" (6.35 mm) stainless steel balls were used. Samples were milled for four 3 min runs with 3 min stops in between.

Example 2

Stock solutions of $BaCl_2$ (0.1 M), $CaCl_2$) (0.1 M), and $Na(SO_4)_2$ (0.2 M) were prepared. In a beaker at room temperature, 19 ml of $BaCl_2$ solution followed by 2 mg of a composition from Example 1 were added. The resulting solution was sonicated for about 30 min, to ensure dispersion of the composition in the $BaCl_2$ solution. 1 ml of $Na(SO_4)_2$ solution was added dropwise. Finally, the solution was maintained statically overnight and then centrifuged. The supernatant was used to measure the concentrations of barium and/or calcium ions using CV.

For measurements at 110° C., after the addition of $Na(SO_4)_2$ solution, the solution was transferred to a hydrothermal vessel and placed in the oven at 110° C. for 8 hours. The solution was then centrifuged and the concentration of barium and calcium were measured in the supernatant using CV.

Each measurement included a standard with only the stock solution, commercial graphene (CG) without EDTA and EDTA without a substrate as controls.

Measurements with calcium or calcium and barium were performed as described above using $CaCl_2$) instead of or in addition to $BaCl_2$.

Example 3

The methods correspond to those Example 2 except that the composition from Example 1 was added after the addition of $Na(SO_4)_2$ solution and scale had formed.

Example 4

To form electrodes, coating was performed by making a slurry of the composition of Example 1 with PVDF and carbon black with a ratio (80:10:10) wt. %, with a sufficient amount of NMP. Drying was performed in a vacuum oven at 50-100° C. overnight.

Figure 9A:
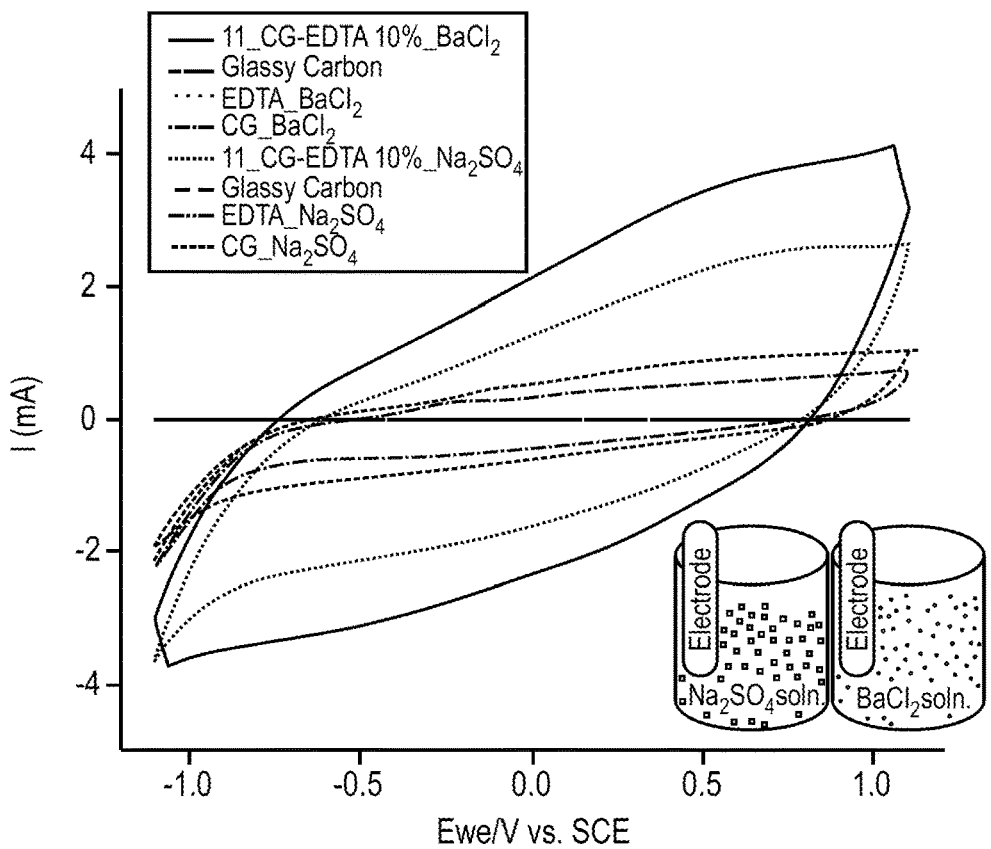
FIG. 9A depicts cyclic voltammograms (CVs).
Figure 9B:
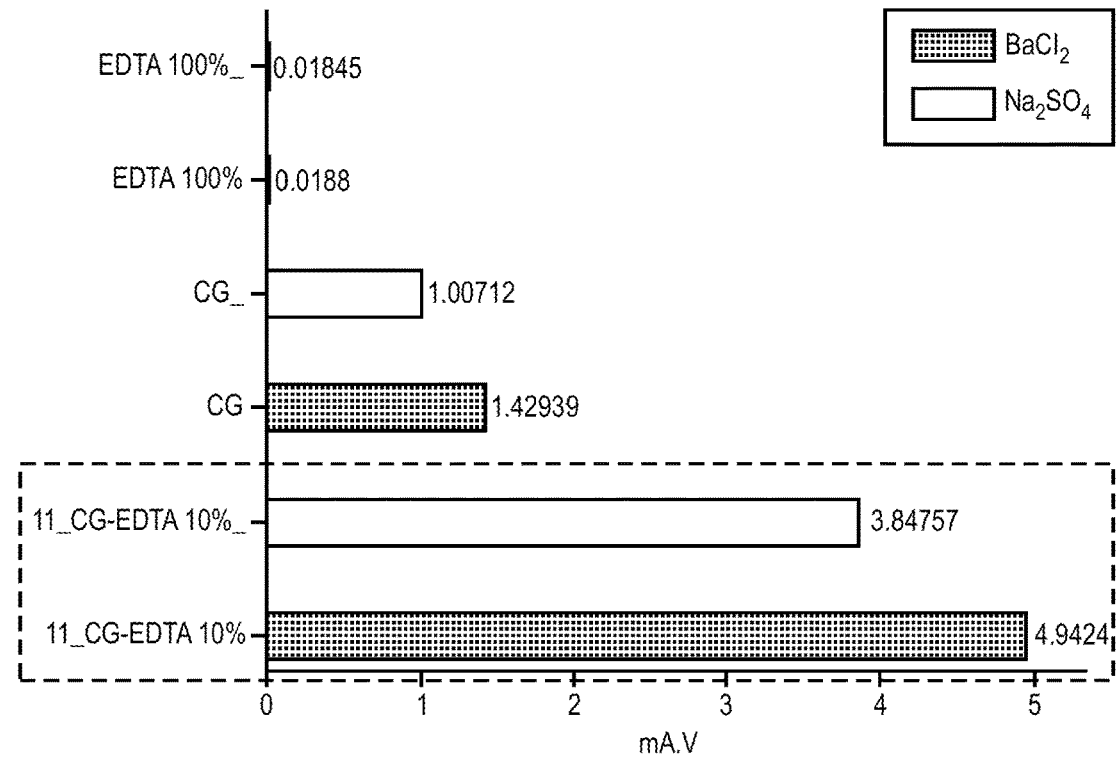
FIG. 9B depicts a bar graph of reduction areas from CV.

To verify the dissolution mechanism, solubility tests were performed using barium chloride and sodium sulfate solutions in the presence of CG substrate with 10% of EDTA, CG substrate alone, and EDTA alone. A first electrode was immersed in a $BaCl_2$ solution, and a second electrode was immersed in a $Na_2SO_4$)$_2$ solution, to check the reactivity of the compositions materials toward barium cations and sulfate anions. The reduction area was calculated from the CV. No current was observed during the CVs from the glassy carbon, EDTA_BaCl$_2$ and EDTA_Na$_2$SO$_4$ samples (FIG. 9A). The CV results (FIGS. 9A and 9B) showed that CG-EDTA 10% reacted more with barium cations compared to sulfate anions (dashed rectangle). This is attributed to the high binding affinity of CG-EDTA 10% toward barium. Therefore, in case of the presence of barium sulfate scale in a solution, the CG-EDTA 10% nanocomposite will dissociate the scales into barium cations and sulfate anions, and the barium will bind to it, thereby enhancing the dissolution efficiency of barium cations.

Example 5

Figure 10A:
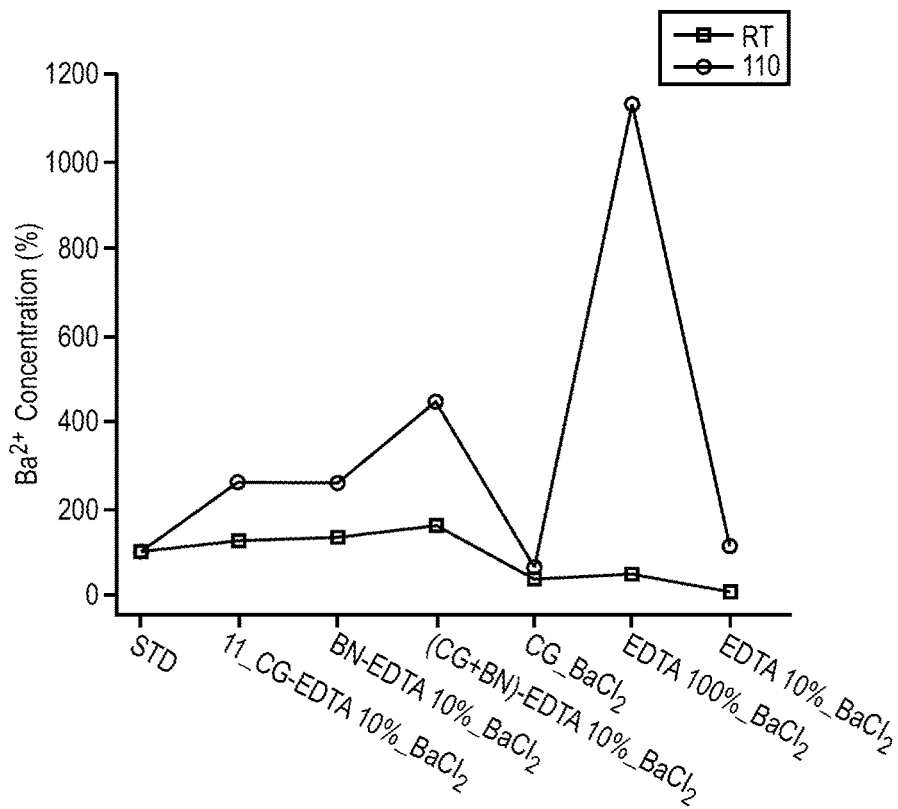
FIG. 10A depicts a plot of barium cation concentrations for different compositions.
Figure 10B:
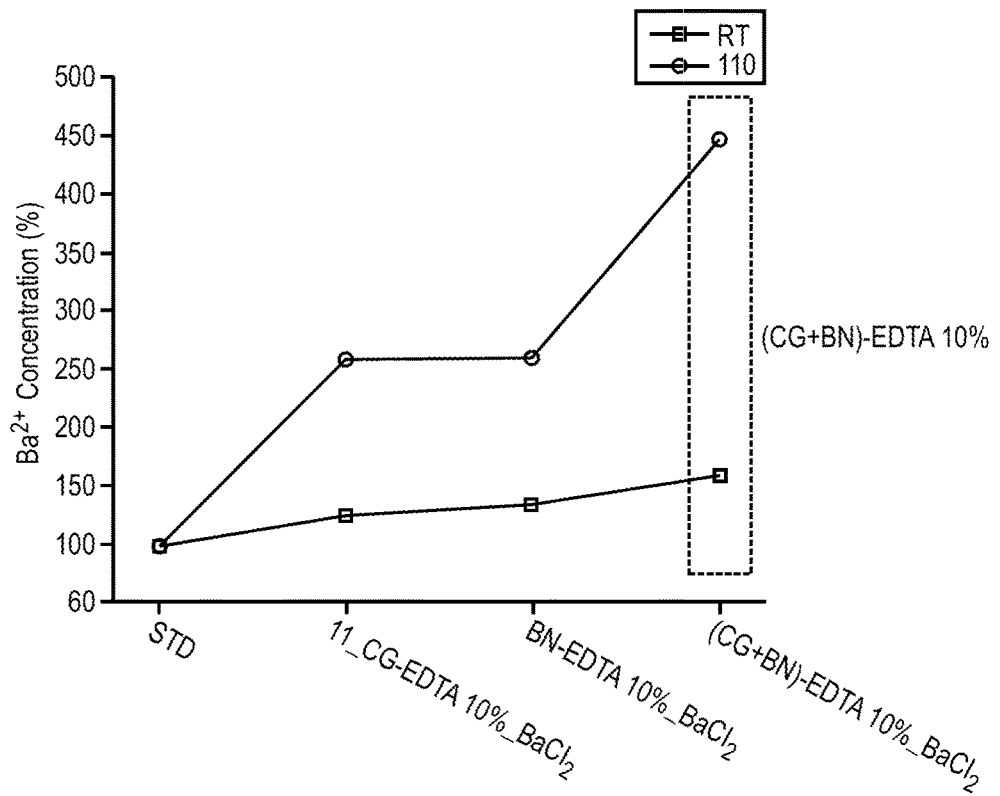
FIG. 10B depicts a plot of barium cation concentrations for different compositions.
Figure 10C:
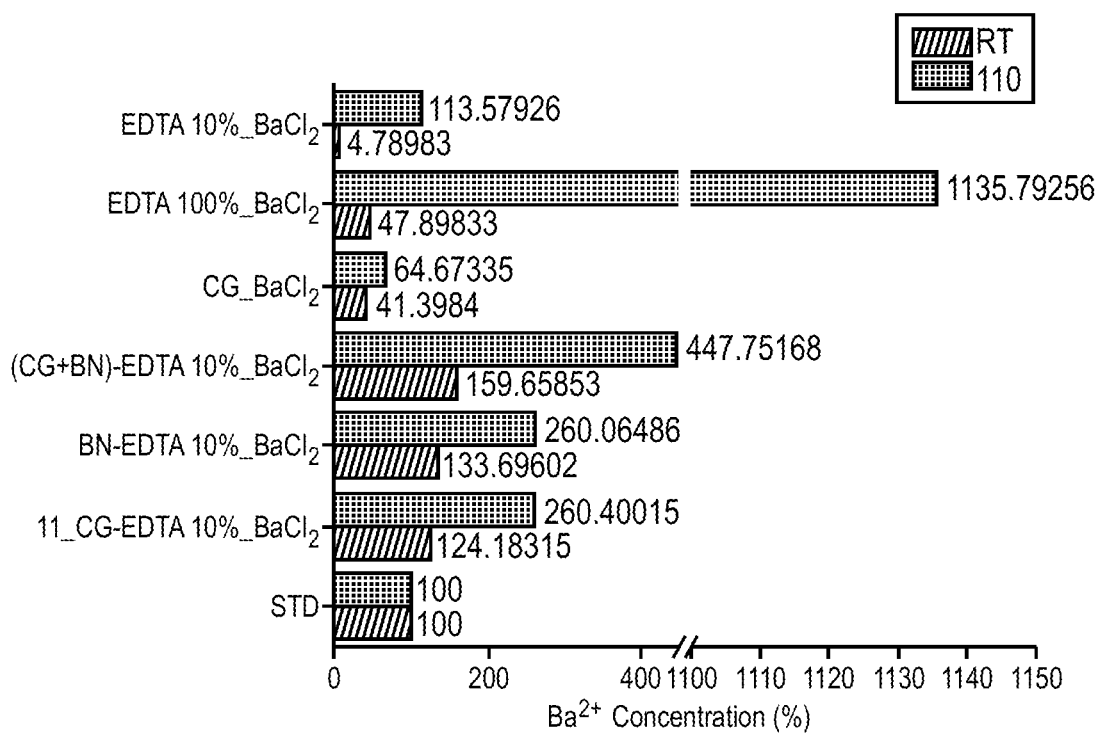
FIG. 10C depicts a bar graph of barium cation concentrations for different compositions.
Figure 10D:
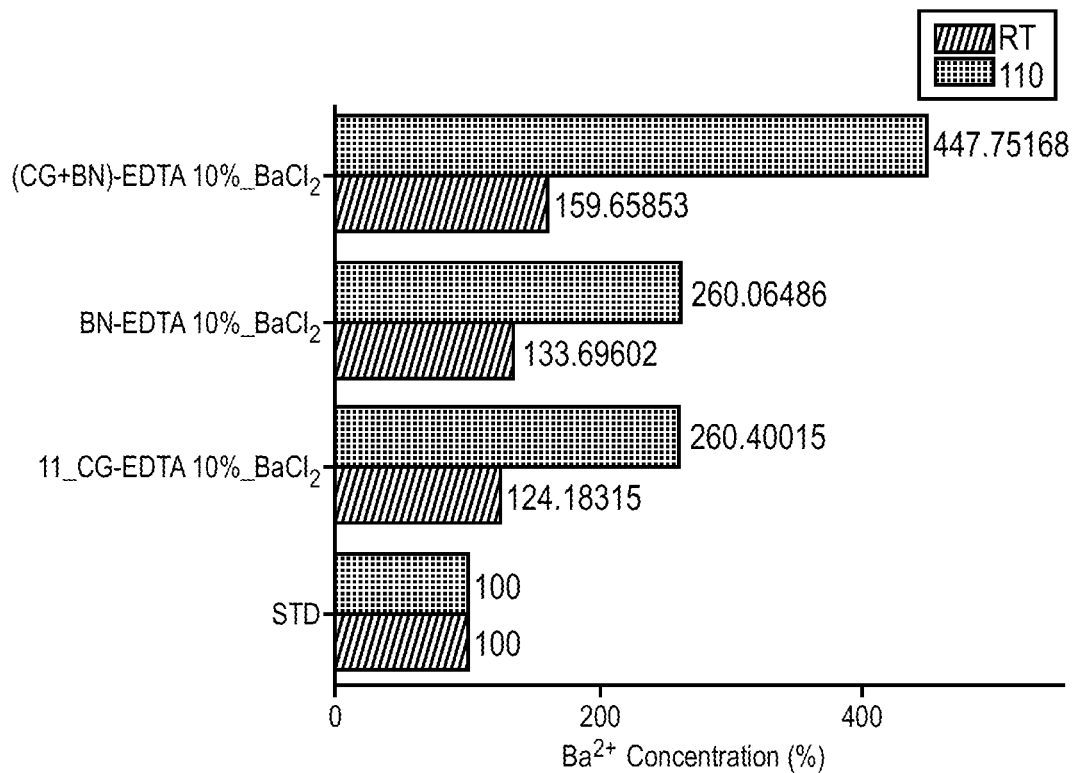
FIG. 10D depicts a bar graph of barium cation concentrations for different compositions.

The concentration percentages of barium cations in the supernatants of barium sulfate scale solutions with the compositions of Example 1 was measured using the methods of Example 2. FIGS. 10A and 10C show concentration percentages of barium cations in the supernatants of the compositions in barium sulfate scale solution at room temperature and 110° C. calculated from the reduction area of CV visualized as plots and bar graphs, respectively. FIGS. 10B and 10D show zoom ins of portions of FIGS. 10A and 10C, respectively. The results for (CG+BN)-EDTA-10%, which had the highest dissolution efficiency for barium sulfate scales, are indicated by a dashed rectangle in FIG. 10B.

The percentages correspond to the percentage of barium cations in solution relative to the control after normalization to 100%. The STD was a mix of the $BaCl_2$ and $Na(SO_4)_2$ solutions, which led instantly to the formation of a $BaSO_4$ precipitate. The concentration percentage of barium cations in STD that was calculated from the reduction area of CV was found to be zero, indicating that no free barium cations were in solution and all barium cations had reacted with $SO_4^{2-}$ anions to form $BaSO_4$ scale precipitate.

CG+BN with 10% EDTA had a dissolution efficiency of barium sulfate scales 150 times higher relative to 10% ETDA alone at room temperature (25° C.) and almost five times higher at 110° C. Without wishing to be bound by theory, it is believed that the atomic size of barium cations led to a more favorable adsorption of the barium cations on the CG+BN substrate relative to CG as the CG+BN substrate has a larger specific surface area relative to CG.

Without wishing to be bound by theory, it is believed that strontium sulfate ($SrSO_4$) scale behaves like barium sulfate scale, except that the former is more soluble. Many barium sulfate scales encountered in the filed contain strontium sulfate (celestine) as well. Therefore, the CG+BN substrate with EDTA is expected to demonstrate the best performance for dissolving strontium sulfate scales.

Example 6

Figure 11A:
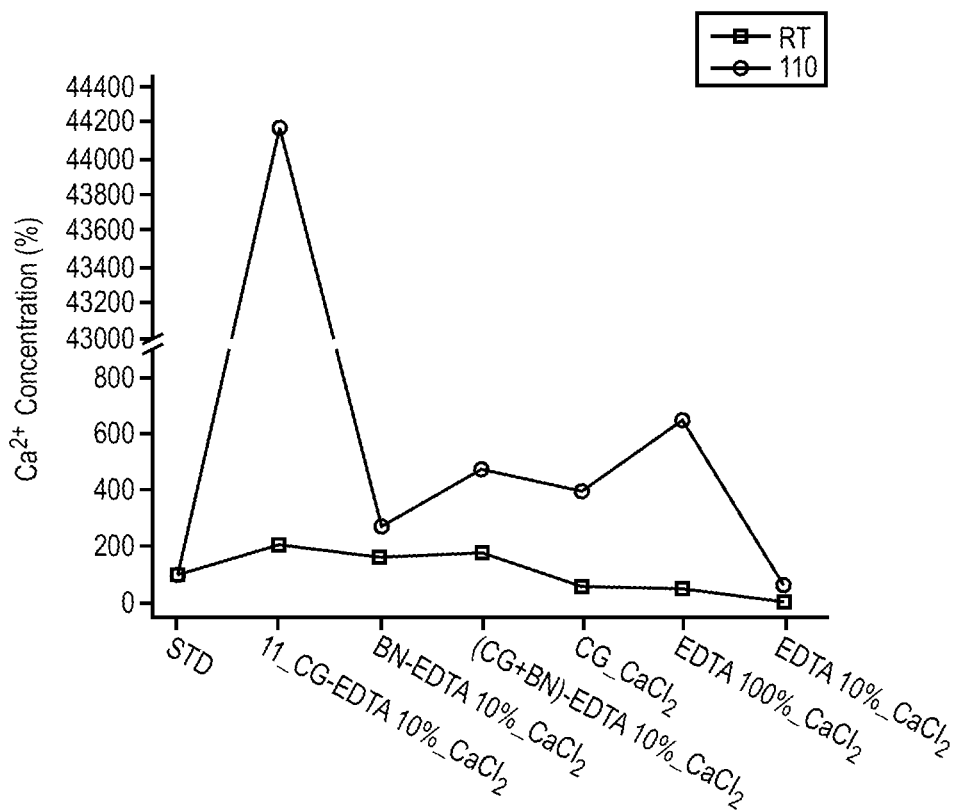
FIG. 11A depicts a plot of calcium cation concentrations for different compositions.
Figure 11B:
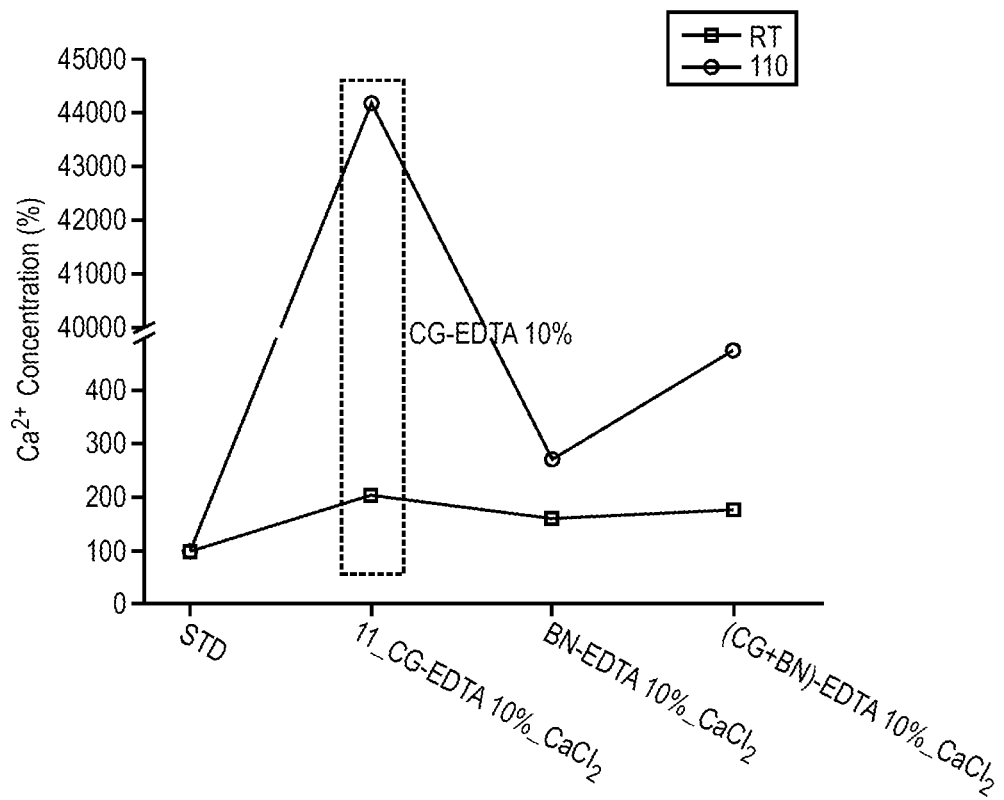
FIG. 11B depicts a plot of calcium cation concentrations for different compositions.
Figure 11C:
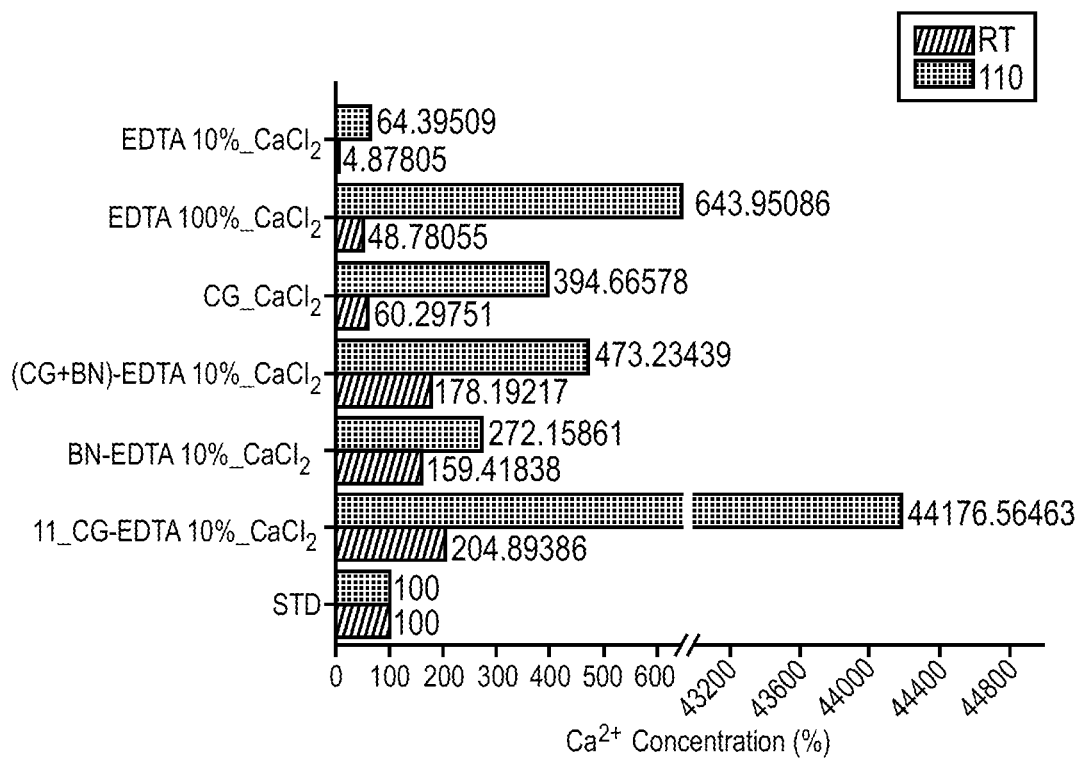
FIG. 11C depicts a bar graph of calcium cation concentrations for different compositions.
Figure 11D:
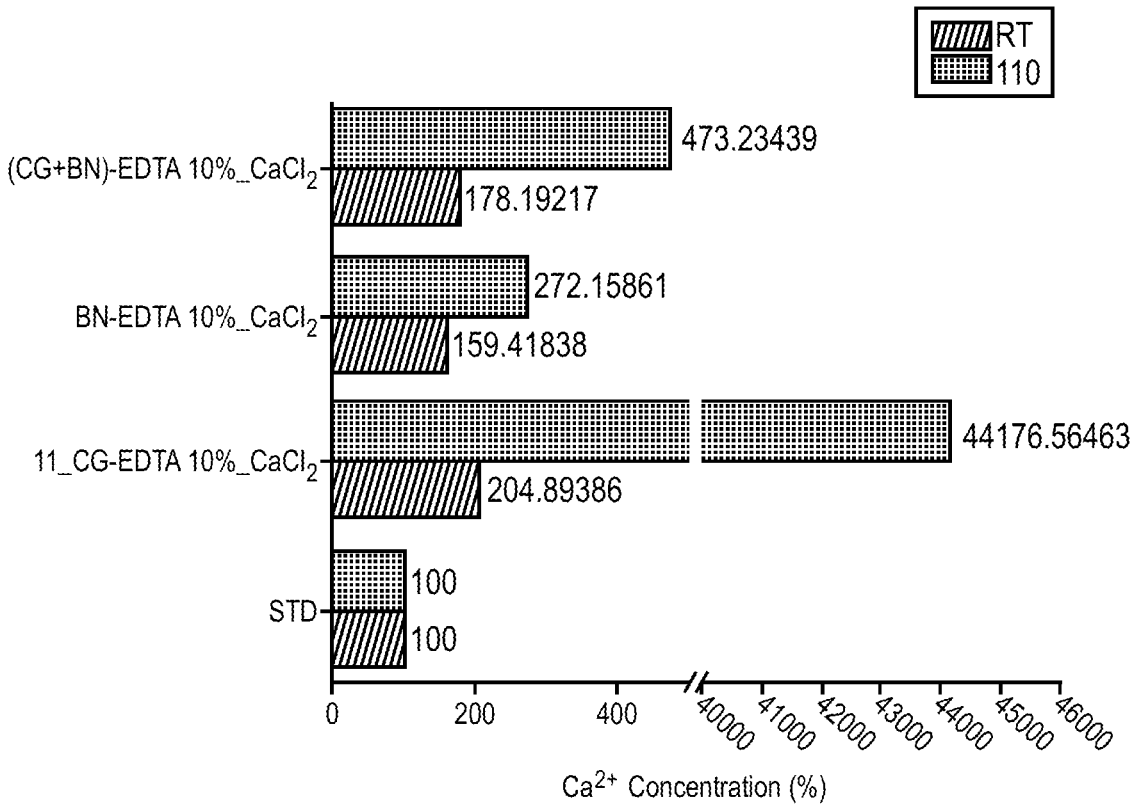
FIG. 11D depicts a bar graph of calcium cation concentrations for different compositions.

The concentration percentages of barium cations in the supernatants of barium sulfate scale solutions with the compositions of Example 1 were measured using the methods of Example 2. FIGS. 11A and 11C show concentration percentages of calcium cations in the supernatants of the compositions in calcium sulfate scale solution at room temperature and 110° C. calculated from the reduction area of CV visualized as plots and bar graphs, respectively. FIGS. 11B and 11D show zoom ins of portions of FIGS. 11A and 11C, respectively. The results for CG-EDTA-10%, which had the highest dissolution efficiency for calcium sulfate scales, are indicated by a dashed rectangle in FIG. 11B.

CG-EDTA 10%, showed significant dissolution enhancement for calcium ions with 44176% compared to 64% of EDTA (10%) alone, at a temperature of 110° C. Without wishing to be bound by theory, it is believed that the atomic size of calcium cations led to a more favorable adsorption of the calcium cations on the CG substrate relative to CG+BN as the CG substrate has a smaller specific surface area relative to CG+BN.

Example 7

Figure 12A:
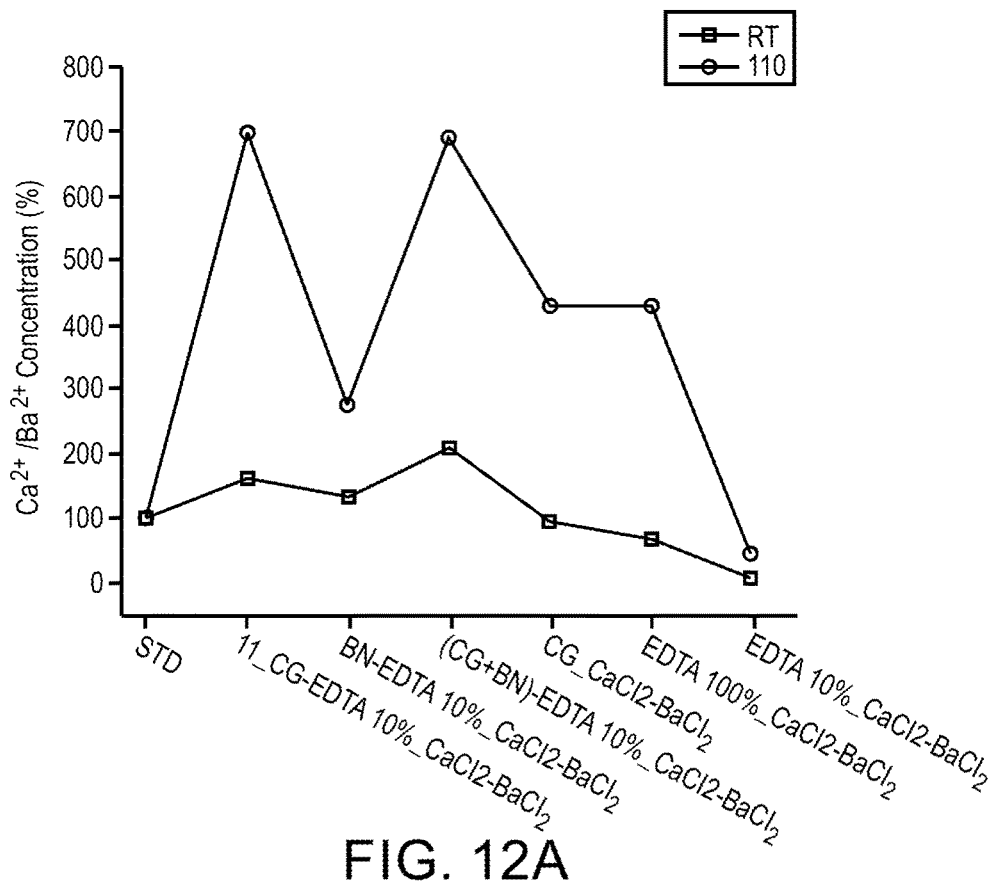
FIG. 12A depicts a plot of barium and calcium cation concentrations for different compositions.
Figure 12B:
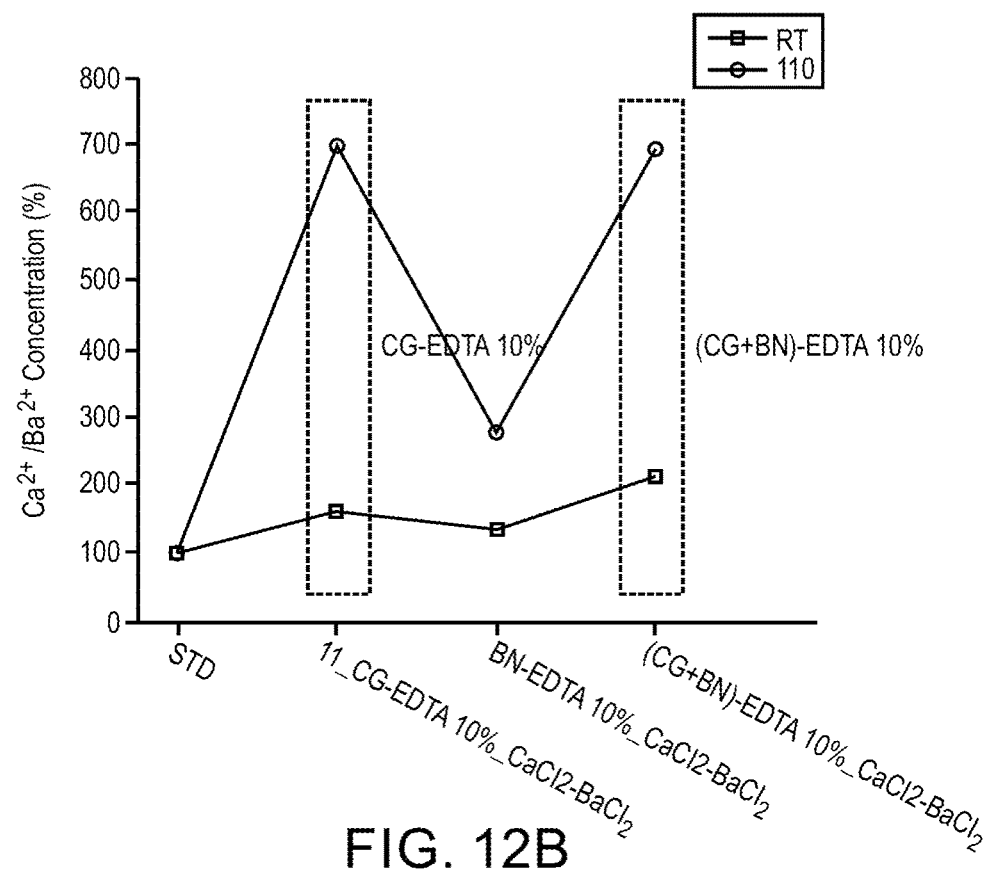
FIG. 12B depicts a plot of barium and calcium cation concentrations for different compositions.
Figure 12C:
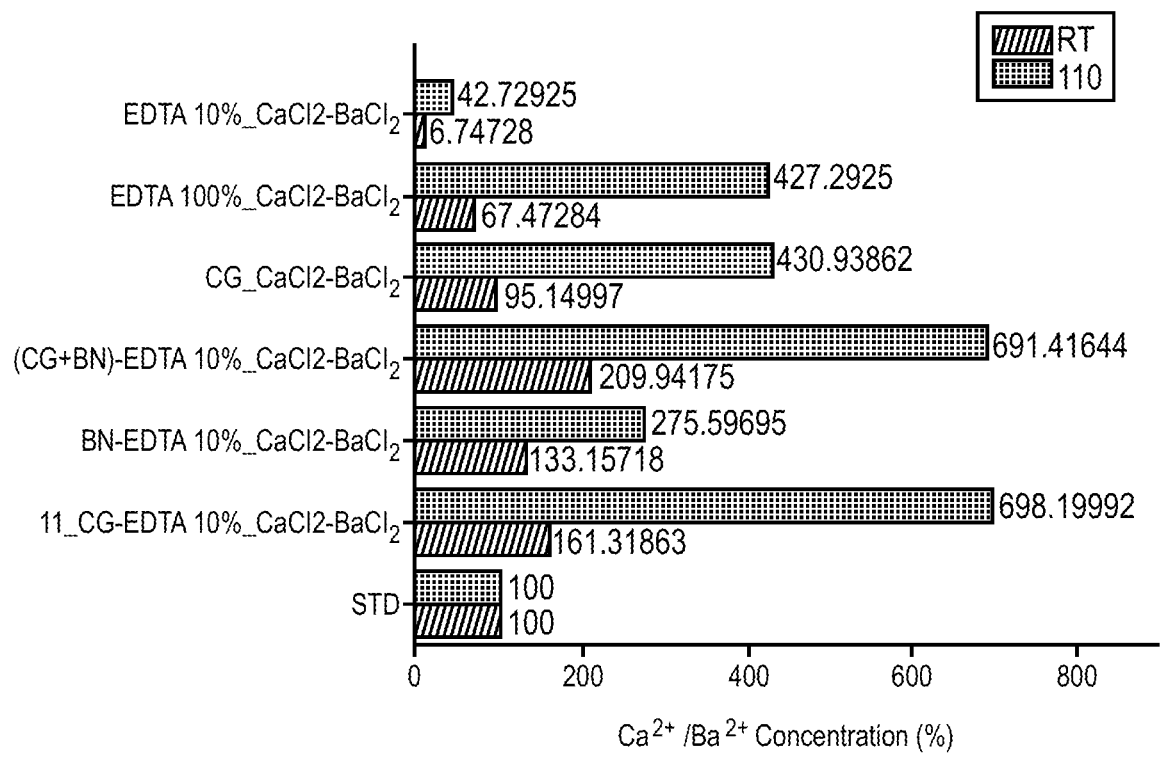
FIG. 12C depicts a bar graph of barium and calcium cation concentrations for different compositions.
Figure 12D:
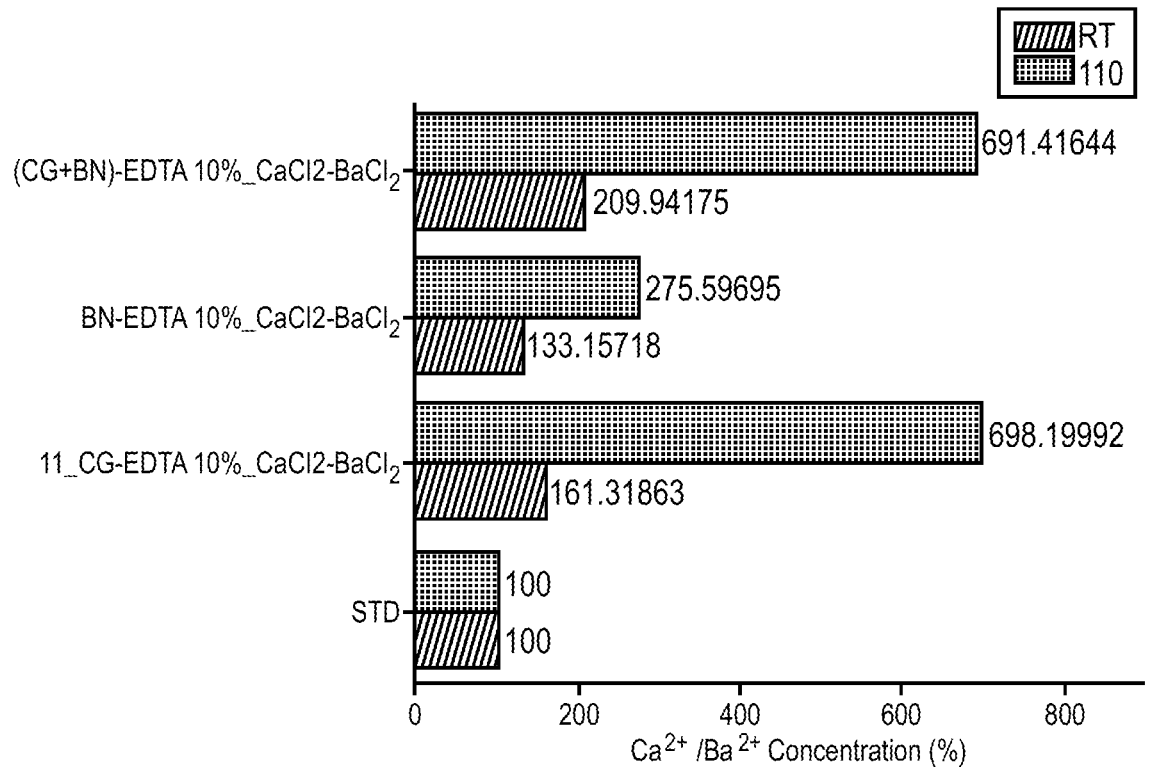
FIG. 12D depicts a bar graph of barium and calcium cation concentrations for different compositions.

The concentration percentages of barium cations in the supernatants of barium sulfate scale solutions with the compositions of Example 1 were measured using the methods of Example 2. FIGS. 12A and 12C show concentration percentages of barium and calcium cations in the supernatants of the compositions in barium calcium sulfate scale solution at room temperature and 110° C. calculated from the reduction area of CV visualized as plots and bar graphs, respectively. FIGS. 12B and 12D show zoom ins of portions of FIGS. 12A and 12C, respectively. The results for CG-EDTA-10% and (CG+BN)-EDTA-10%, which had the highest dissolution efficiency for barium sulfate and calcium sulfate scales, are indicated by dashed rectangles in FIG. 12B.

CG and CG+BN substrates with only 10% of EDTA successfully hindered both calcium and barium scales formation, in comparison to 10% EDTA alone The results of Examples 5-7 demonstrate that the compositions had higher barium and calcium adsorption efficiency relatively to EDTA alone at low and high temperatures and were able to inhibit scale formation and enhance the dissolution rate of scale. Additionally, less EDTA would have to be used.

Other Embodiments

While certain embodiments have been disclosed above, the disclosure is not limited to such embodiments.

As an example, while embodiments have been disclosed that include graphene, boron nitride or a graphene-boron nitride hybrid as the substrate 2100, the disclosure is not limited to such embodiments. In some embodiments, the substrate 2100 includes carbon nanotubes, activated carbon, $MoS_2$, phosphorene, borophene and/or silicene.

As another example, in some embodiments, the composition 2000 and/or 6000 can be used as part of a pretreatment. In some embodiments, the composition 2000 and/or 6000 can be used to pretreat seawater prior to its addition to a well.

As a further example, in certain embodiments, the composition 2000 and/or 6000 can be used as a cathodic material in a capacitive desalination application.

As an additional example, while embodiments, have been disclosed where the composition reduces (e.g., prevents) scale formation and/or dissolves an existing scale, the disclosure is not limited to such embodiments. In certain embodiments, the composition 2000 and/or 6000 can reduce (e.g., prevent) corrosion in a hydrocarbon (e.g., oil, gas) production, transportation, storage, and/or processing system. Without wishing to be bound by theory, it is believed that certain substrates 2100 (e.g., graphene, boron nitride, graphene-boron nitride hybrid) have anti-corrosive properties, which can reduce (e.g., eliminate) the corrosion associated with scale formation that interferes with fluid flow. Without wishing to be bound by theory, it is believed that the composition 2000 and/or 6000 can coat a component in a hydrocarbon production, transportation (e.g., a pipeline), storage, and/or processing system to protect it from corrosion causing agents, such as water and oxygen, thereby reducing (e.g., preventing) corrosion.

As another example, while embodiments have been disclosed that include the reduction (e.g., prevention) and/or dissolution of scale containing sulfate (e.g., barium sulfate, calcium sulfate, strontium sulfate), the disclosure is not limited to such embodiments. In certain embodiments, the disclosure can be used to reduce (e.g., prevent) the formation of carbonate scales and/or dissolve carbonate scales.

What is claimed:

1. A composition, comprising:
a substrate comprising a graphene-boron nitride hybrid; and
a plurality of first functional molecules attached to the substrate,
wherein the first functional molecules are capable of interacting with ions.

2. The composition of claim 1, wherein the substrate comprises from 10 wt. % to 90 wt. % graphene and from 10 wt. % to 90 wt. % boron nitride.

3. The composition of claim 1, further comprising a plurality of second functional molecules different from the first functional molecules, wherein the second functional molecules are capable of interacting with ions.

4. The composition of claim 3, wherein:
the first functional molecules have a first interaction energy with a first ion; and
the second functional molecules have a second interaction energy with a first ion different from the first interaction energy with the first ion.

5. The composition of claim 4, wherein:
the first functional molecules have a first interaction energy with a second ion; and
the second functional molecules have a second interaction energy with a second ion different from the first interaction energy with the second ion.

6. The composition of claim 1, wherein the first functional molecules comprise a member selected from the group consisting of a chelating agent and a threshold inhibitor.

7. The composition of claim 1, wherein the first functional molecules comprise a member selected from the group consisting of an inorganic phosphate, an organophosphorous compound and an organic polymer.

8. The composition of claim 1, wherein the first functional molecules comprise a member selected from the group consisting of acrylamide (AM), polyacrylamide (PAM), polymethyl methacrylate (PMMA), ethylenediaminetetraacetic acid (EDTA), diethylenetriamine pentaacetic acid (DTPA), poly-phosphono carboxylic acid (PPCA) and diethylenetriaminepenta (methylene phosphonic acid) (DETPMP).

9. The composition of claim 1, wherein the composition comprises 1 wt. % to 20 wt. % of the first functional molecules and 80 wt. % to 99 wt. % of the substrate.

10. The composition of claim 1, wherein a length of the substrate is from 100 nm to 50000 nm.

11. A method comprising:
disposing the composition of claim 1 into a member selected from the group consisting of a hydrocarbon production system, a hydrocarbon transportation system, a hydrocarbon storage system, and a hydrocarbon processing system.

12. The method of claim 11, wherein:
the member comprises a fluid;
the fluid comprises ions; and
at least a portion of the ions interact with the composition.

13. The method of claim 12, wherein the ions comprise a member selected from the group consisting of barium cations, calcium cations and strontium cations.

14. The method of claim 11, wherein a surface of the member comprises scale and disposing the composition into the member dissolves at least a portion of the scale.

15. The method of claim 14 wherein the scale comprises at least one member selected from the group consisting of a barium sulfate scale, a calcium sulfate scale, and a strontium sulfate scale.

16. A composition, comprising:
a substrate comprising boron nitride; and
a plurality of first functional molecules attached to the substrate,
wherein:
the first functional molecules are capable of interacting with ions; and
the first functional molecules comprise a member selected from the group consisting of acrylamide (AM), polyacrylamide (PAM), polymethyl methacrylate (PMMA), ethylenediaminetetraacetic acid (EDTA), diethylenetriamine pentaacetic acid (DTPA), poly-phosphono carboxylic acid (PPCA) and diethylenetriaminepenta (methylene phosphonic acid) (DETPMP).

17. The composition of claim 16, further comprising a plurality of second functional molecules different from the first functional molecules, wherein the second functional molecules are capable of interacting with ions.

* * * * *